United States Patent
Kennedy et al.

(10) Patent No.: US 7,909,998 B2
(45) Date of Patent: Mar. 22, 2011

(54) ENCAPSULATED WATER TREATMENT SYSTEM

(75) Inventors: Gregory Kennedy, Maplewood, MN (US); Chaouki Khamis, Edina, MN (US)

(73) Assignee: Ecowater Systems, LLC, Woodbury, MN (US)

( * ) Notice: Subject to any disclaimer, the term of this patent is extended or adjusted under 35 U.S.C. 154(b) by 0 days.

(21) Appl. No.: 12/754,795

(22) Filed: Apr. 6, 2010

(65) Prior Publication Data

US 2010/0237001 A1  Sep. 23, 2010

Related U.S. Application Data

(63) Continuation of application No. 11/814,808, filed as application No. PCT/US2006/003172 on Jan. 27, 2006, now Pat. No. 7,736,503.

(60) Provisional application No. 60/647,680, filed on Jan. 27, 2005.

(51) Int. Cl.
*B01D 27/08* (2006.01)
(52) U.S. Cl. ......... 210/232; 210/239; 210/240; 210/452
(58) Field of Classification Search ............ 210/232, 210/239, 240, 452
See application file for complete search history.

(56) References Cited

U.S. PATENT DOCUMENTS

| | | | |
|---|---|---|---|
| 3,598,243 | A | 8/1971 | Gutkowski |
| D265,277 | S | 7/1982 | Dunn |
| 4,496,906 | A | 1/1985 | Clack |
| 4,587,518 | A | 5/1986 | King |
| 4,645,601 | A | 2/1987 | Regunathan et al. |
| 4,708,791 | A | 11/1987 | Dillard |
| D297,857 | S | 9/1988 | Alexander et al. |
| 4,806,912 | A | 2/1989 | Clack |
| 4,830,757 | A | 5/1989 | Lynch et al. |
| 4,851,818 | A | 7/1989 | Brown et al. |
| D306,754 | S | 3/1990 | Petrucci et al. |
| 4,915,831 | A | 4/1990 | Taylor |
| 4,956,086 | A | 9/1990 | Thomsen et al. |
| 5,046,197 | A | 9/1991 | Chernuchin et al. |
| 5,122,265 | A | 6/1992 | Mora et al. |
| 5,132,017 | A | 7/1992 | Birdsong et al. |

(Continued)

FOREIGN PATENT DOCUMENTS

DE 9422466 1/2003

(Continued)

OTHER PUBLICATIONS

International Preliminary Report on Patentability related to PCT/US2006/03172 dated Apr. 26, 2007.

(Continued)

*Primary Examiner* — John Kim
(74) *Attorney, Agent, or Firm* — DeLio & Peterson, LLC; Robert Curcio, Esq.

(57) ABSTRACT

A water treatment system is provided having an encapsulate manifold with a reverse osmosis cartridge and one or more filter cartridges. The filter cartridge includes a detent for being received within a slot in the manifold head for secure locking engagement. The water treatment system further includes a single probe conductivity monitoring system for monitoring the performance of a reverse osmosis membrane. The water treatment system is also provided in a modular arrangement wherein manifold heads are physically and fluidly coupled together via a clip which interfaces with the modular manifold heads. The water treatment system also allows for a retrofit application to include a permeate pump. The cartridges are also designed to provide a minimum annular inlet gap to minimize spillage during changing of the cartridges.

9 Claims, 10 Drawing Sheets

U.S. PATENT DOCUMENTS

| | | | |
|---|---|---|---|
| 5,296,148 | A | 3/1994 | Colangelo et al. |
| 5,405,528 | A | 4/1995 | Selbie et al. |
| D361,823 | S | 8/1995 | Layton et al. |
| 5,456,830 | A | 10/1995 | Stanford |
| 5,503,736 | A | 4/1996 | Schoenmeyr |
| 5,658,457 | A | 8/1997 | Schoenmeyr |
| 5,744,030 | A | 4/1998 | Reid et al. |
| 5,779,911 | A | 7/1998 | Haug et al. |
| D407,462 | S | 3/1999 | Bishop et al. |
| 6,007,710 | A | 12/1999 | Pavel |
| D433,094 | S | 10/2000 | Magnusson et al. |
| D448,448 | S | 9/2001 | Hughes et al. |
| 6,325,929 | B1 | 12/2001 | Bassett |
| D454,615 | S | 3/2002 | Neal |
| D472,299 | S | 3/2003 | Fritze |
| 6,533,931 | B1 | 3/2003 | Reid |
| D472,604 | S | 4/2003 | Fritze |
| 6,740,235 | B2 | 5/2004 | Gill |
| 6,830,683 | B2 | 12/2004 | Gundrum et al. |
| 2002/0046556 | A1 | 4/2002 | Reid |
| 2006/0144765 | A1 | 7/2006 | Skwiot |

FOREIGN PATENT DOCUMENTS

| | | |
|---|---|---|
| EP | 0231862 | 8/1987 |
| EP | 0509332 | 10/1992 |
| JP | 62174101 | 11/1987 |
| JP | 5345181 | 12/1993 |
| WO | 0180967 | 11/2001 |
| WO | 0212124 | 2/2002 |
| WO | 03091575 | 11/2003 |

OTHER PUBLICATIONS

European Patent Office Supplemental European Search Report dated Feb. 18, 2009 for related EP06734034.

ENCAPSULATED WATER TREATMENT SYSTEM

This application is a continuation application of U.S. patent application Ser. No. 11/814,808, filed on Sep. 24, 2007, now U.S. Pat. No. 7,736,503, and which claims priority to International Application No. PCT/US06/03172 filed Jan. 27, 2006, claiming benefit to U.S. Provisional Patent Application Ser. No. 60/647,680, filed Jan. 27, 2005.

BACKGROUND OF THE INVENTION

1. Field of the Invention

The present invention relates to water treatment systems and, in particular, to such systems having an encapsulated manifold head and a reverse osmosis cartridge and one or more filter cartridges.

2. Description of Related Art

Reverse osmosis systems are known. The main part of the system is a semi-permeable membrane through which the untreated water passes. Such systems typically include an additional carbon or ceramic filter which removes contaminates either prior to passing through the membrane or after. Such systems are often installed in residential applications.

The prior art includes electronic systems which detect when the reverse osmosis membrane requires replacement. Typical prior art systems include measuring the conductivity of the water entering the reverse osmosis cartridge, and then measuring the conductivity of the water at the outlet of the reverse osmosis cartridge. The conductivity of the water is proportional to the total dissolved solids. A ratio of the conductivity levels will provide an indication of the rejection efficiency of the reverse osmosis membrane.

Prior art systems also include an application wherein a permeate pump is included in a factory installation. The permeate pump provides greater efficiency in the system. The permeate pump increases the net pressure across the reverse osmosis membrane by isolating the membrane pressure from the pressure in the products water and thus reducing the permeate back pressure.

The prior art also includes systems which address reducing the spillage of fluid occurring during replacement of the cartridges.

SUMMARY OF THE INVENTION

It is an object of the present invention to provide an improved locking mechanism for a filter cartridge and manifold head.

It is a further object of the present invention to provide an improved method of monitoring the performance of a reverse osmosis membrane in a drinking water supply system.

It is a further object of the present invention to provide a modular manifold head system.

It is an object of the present invention to provide a system for retrofitting a reverse osmosis filter system to include a permeate pump application.

It is an object of the present invention to provide a cartridge which has a reduced inlet opening to reduce spillage during changing of the cartridge.

DESCRIPTION OF THE PREFERRED EMBODIMENT(S)

Figure 1:
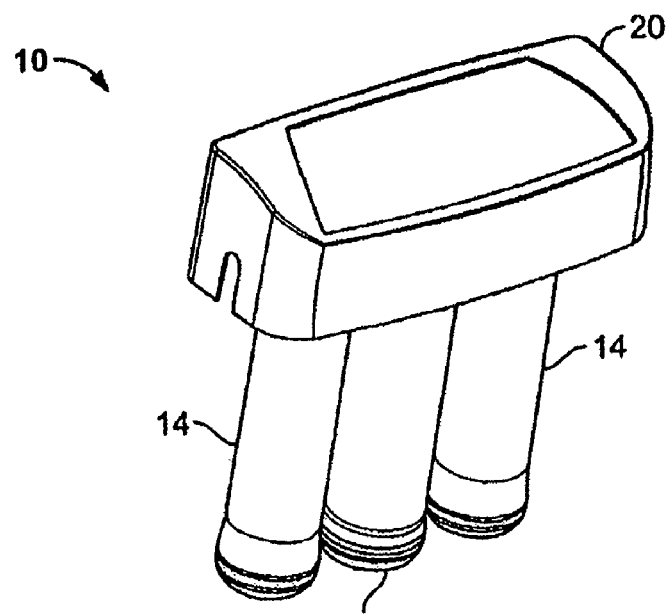
FIG. 1 is a perspective view of a water treatment system with a reverse osmosis cartridge and two filter cartridges.

FIG. 1 shows one embodiment of a water treatment system 10 in accordance with the present invention. The system includes a manifold head 12, (see FIG. 5) a first filter cartridge 14, a reverse osmosis cartridge 16 and a second filter cartridge 14. A manifold cover 20 is also shown.

Figure 2:
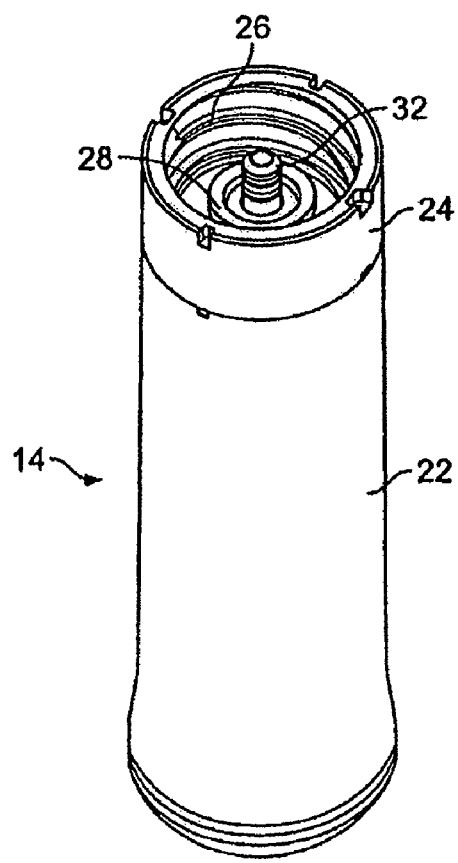
FIG. 2 is a perspective view of a filter cartridge of FIG. 1.

FIG. 2 shows a filter cartridge 14 in accordance with the present invention. The filter cartridge 14 includes a housing 22 having a cartridge outer annular collar 24 with a double lead thread 26. A cartridge inner annular collar 28 is also shown which includes an O ring to provide a seal. A connection fitting 32 is shown extending through the cartridge inner annular collar 28.

Figure 3:
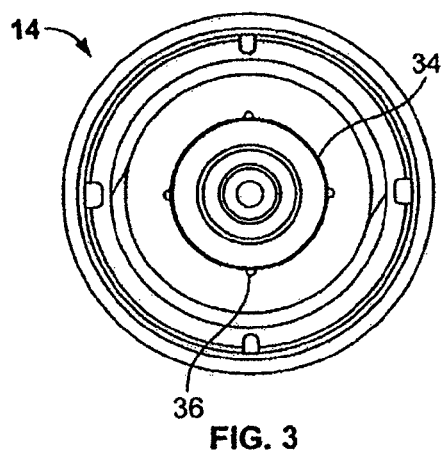
FIG. 3 is a top view of the filter cartridge of FIG. 2.

FIG. 3 shows a top view of the filter cartridge 14 and shows the cylindrical wall 34 of the cartridge inner annular collar 28, as well as the longitudinal extending bead 36.

Figure 4:
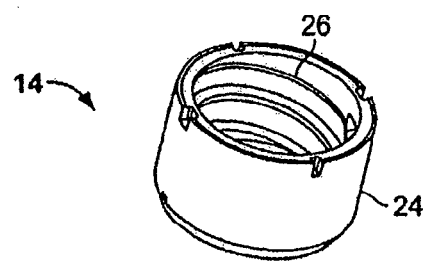
FIG. 4 is an exploded view of the filter cartridge of FIG. 2.
Figure 4:
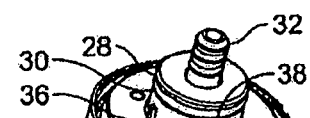
Figure 4:
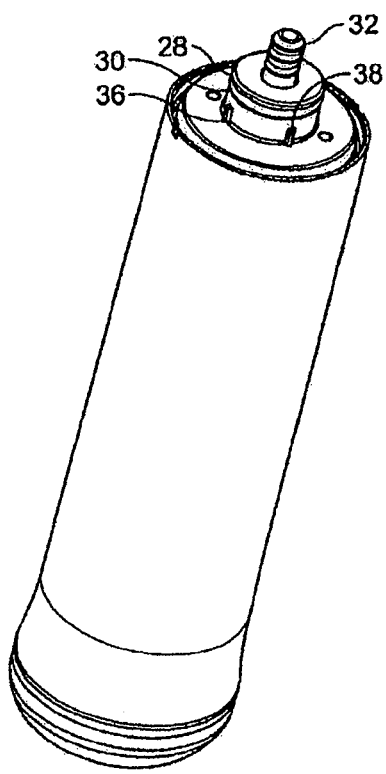

FIG. 4 shows the filter cartridge 14 in an exploded view so as to more clearly show the longitudinal extending bead 36. It can be seen that the longitudinal extending bead includes a leading end 38.

Figure 5:
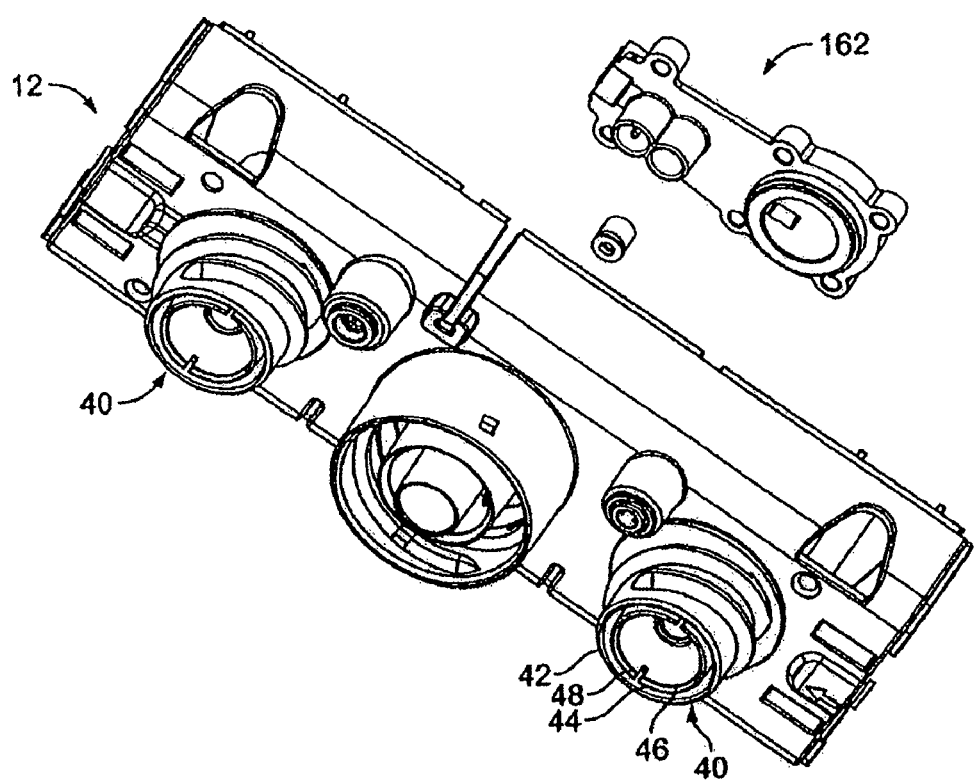
FIG. 5 is a bottom perspective view of a manifold head incorporated in the water treatment system of FIG. 1.

FIG. 5 shows the manifold head 12 having the filter cartridge connection fitting 40. The filter cartridge connection fitting 40 includes a threaded outer annular collar 42 and an inner annular collar 44. The inner annular collar 44 having an annular lip 46 and four longitudinal slots 48. The longitudinal slots 48 are equally spaced apart from one another.

It will be appreciated that when the filter cartridge 14 is rotated into a fully secured position onto the connection fitting 40, the filter cartridge 14 comes to rest with the longitudinal extending beads 36 being received by the respective slot 48.

Figure 6:
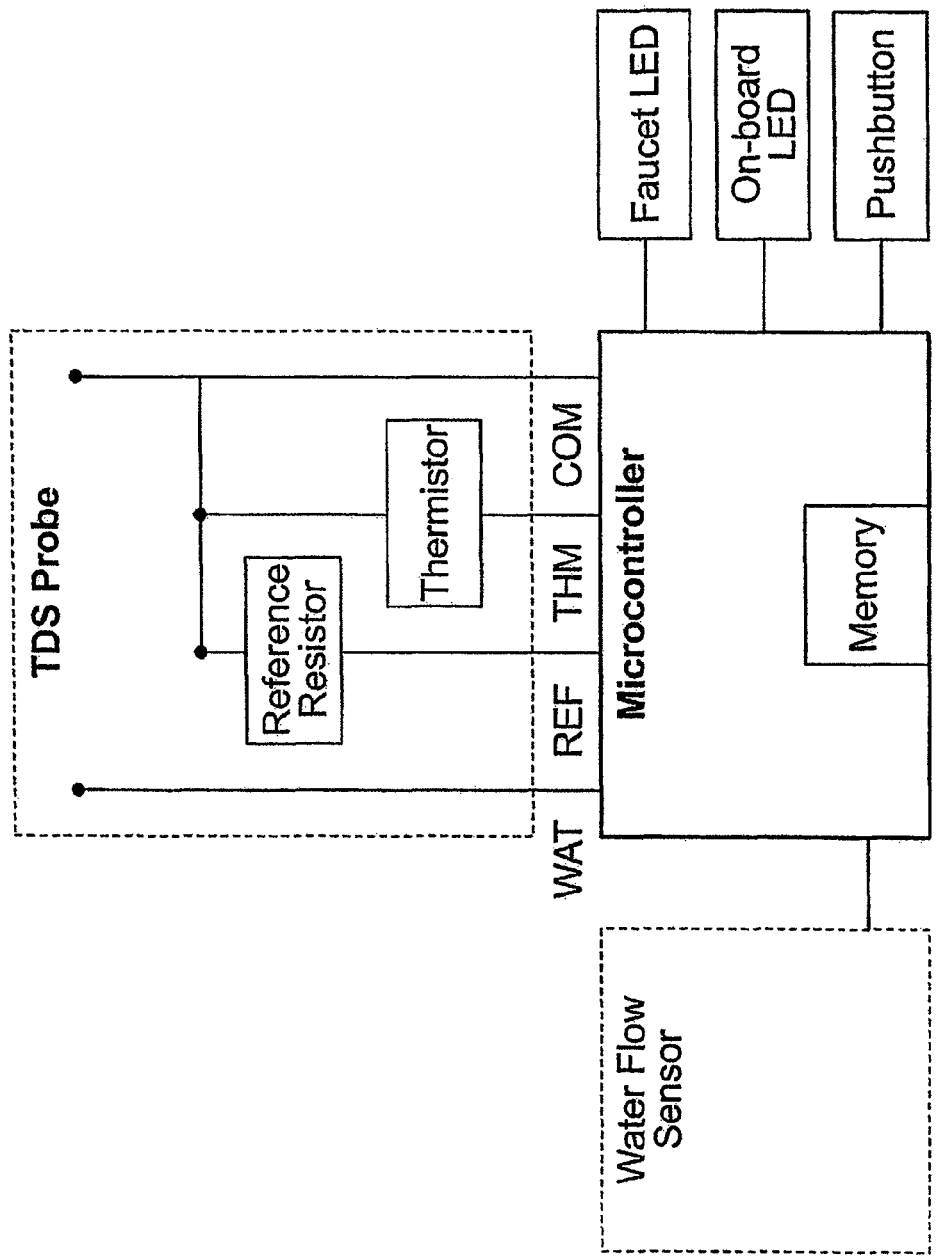
FIG. 6 is a block diagram of a reverse osmosis membrane monitoring system.

FIG. 6 shows a block diagram of a system for monitoring the performance of a reverse osmosis membrane. The system includes a microcontroller having a memory wherein a program resides. The system includes a single probe set which is located downstream of the reverse osmosis membrane. The probe set includes a reference resistor and a thermal resistor. The microcontroller is coupled to a faucet LED for providing an indication to replace the reverse osmosis cartridge. The microcontroller is also coupled to an onboard LED for feedback during operation of an onboard push button also coupled to the microcontroller. A water flow sensor is also coupled to the microcontroller.

Figure 7:
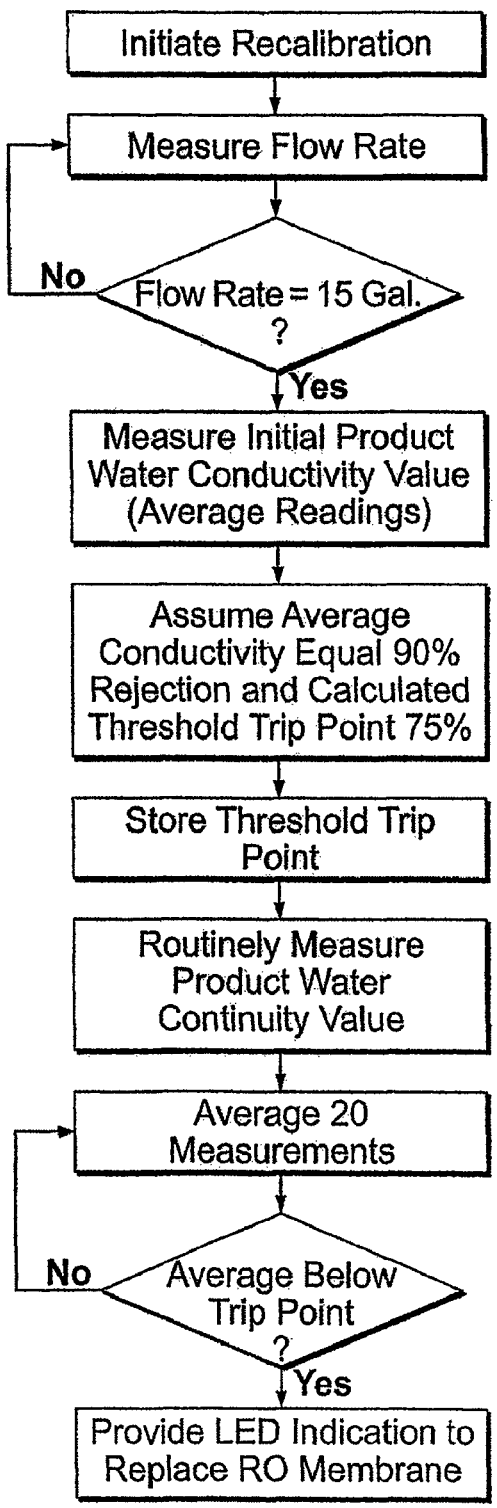
FIG. 7 is a process flow chart for the system of FIG. 6.

FIG. 7 shows a block diagram which represents the functional steps as executed by the program resident in the memory.

Figure 8:
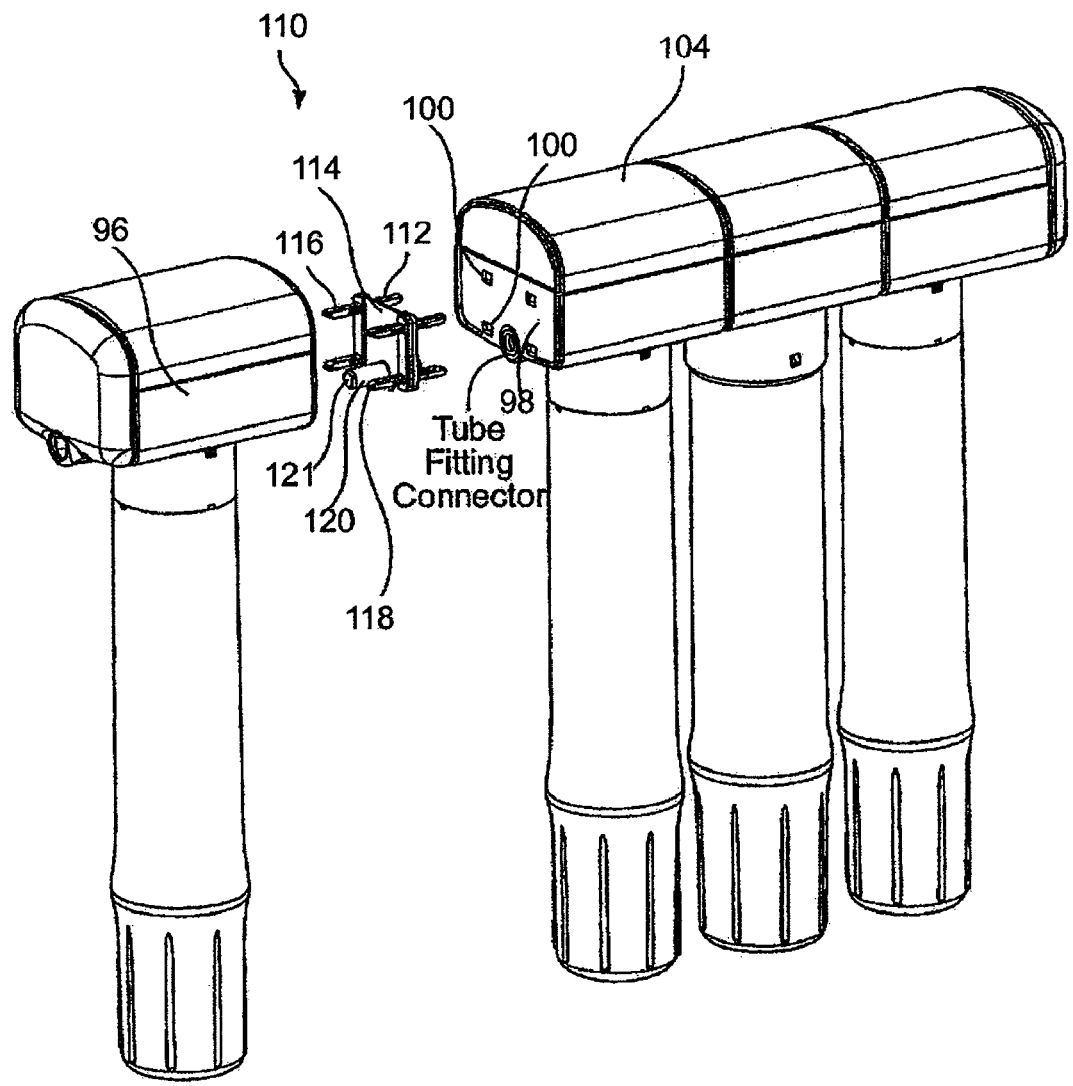
FIG. 8 is a perspective view of a modular manifold head system.

FIG. 8 is an embodiment of a modular water treatment system. The water treatment system shown in FIG. 8 includes a modular manifold head 96, a manifold cover, a first filter cartridge, a reverse osmosis cartridge and a second filter cartridge. Also shown is a further modular manifold head 104 and cover, as wells as additional cartridge units. The system of FIG. 8 provides a modular system wherein additional modular manifold units may be coupled to the water treatment system via a clip 110. The clip includes a plurality of arms 112 extending from a planar body portion 114. Each arm 112 includes a slot 116 and a slanted leading edge 118. The clip 110 also includes a tubular portion 120 extending through the main body portion. The tubular portion 120 includes a bore 121 extending throughout the tubular portion.

Each manifold includes an end wall 98 having four openings 100.

Figure 9:
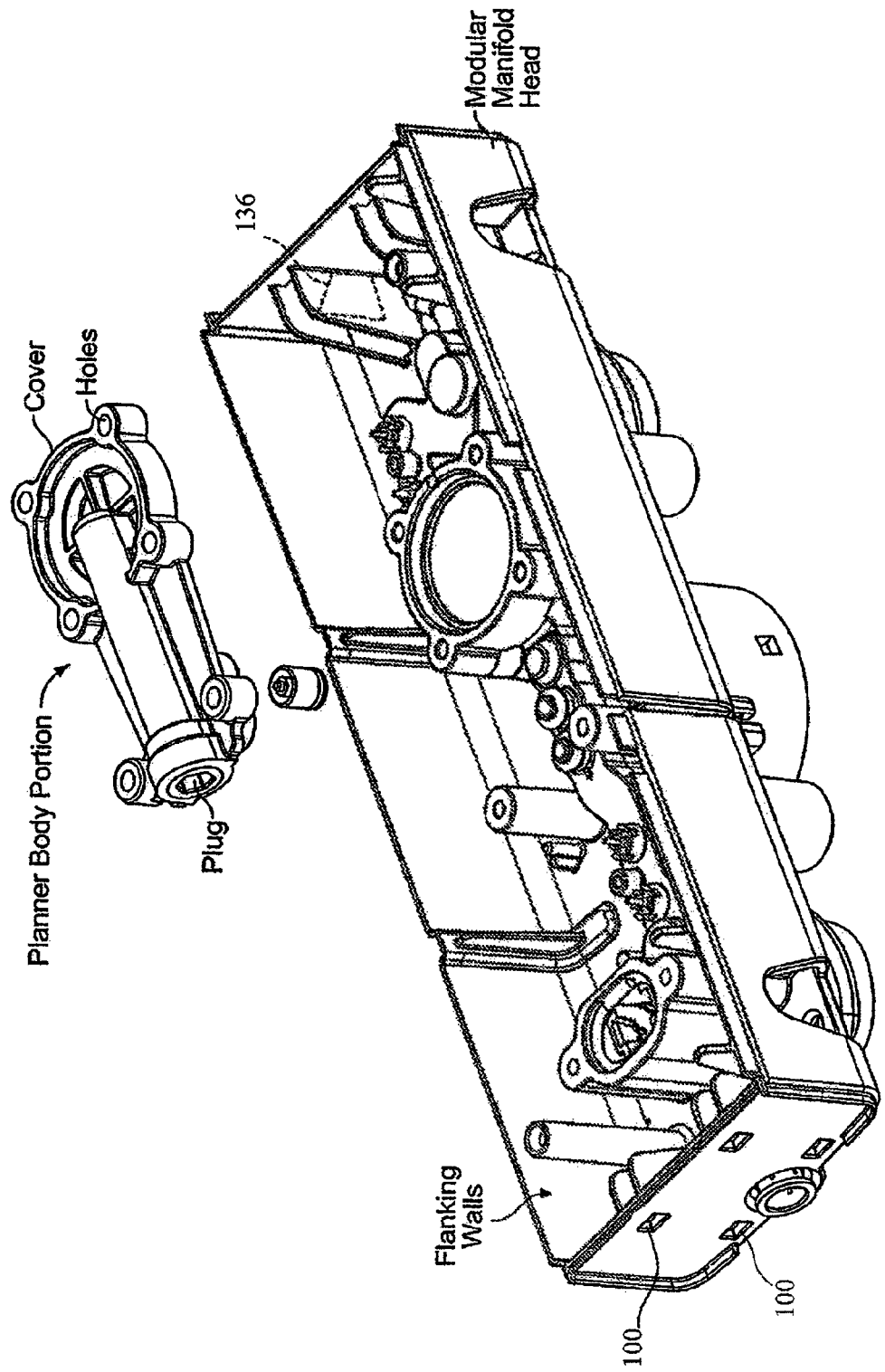
FIG. 9 is top perspective view of a modular manifold head.
Figure 9A:
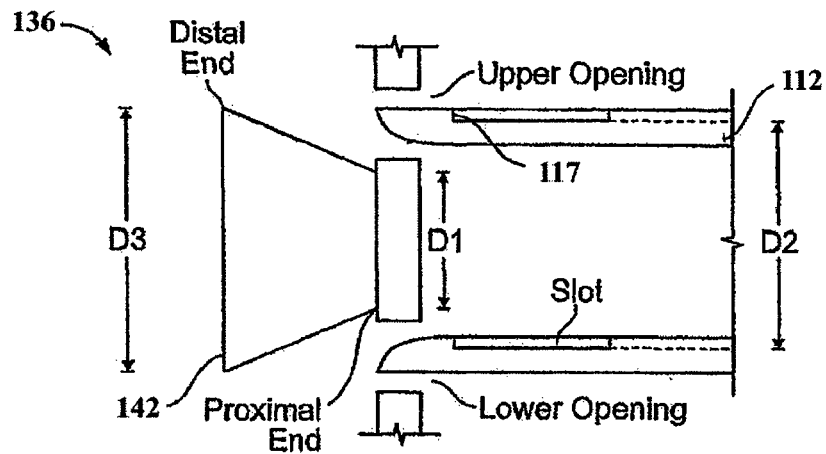

FIG. 9 shows a perspective view of the manifold including the two ends each having four openings 100. The openings are arranged in pairs, one above the other. For example, lower opening and upper opening comprise one pair. Each pair of openings includes a pair of upright walls in a spaced apart facing relationship. The upright walls are shown extending from the interior surface of the end wall and the lower surface of the manifold head. A flange 136 extends from the inner surface of the end wall towards the interior compartment of the manifold head. The flange 136 includes an upper ramp and a lower ramp 138, 140. The flange 136 includes a forward edge 142 and first and second side edges 144, 146. The forward edge is generally parallel to the end wall. The first side edge and second side edges form the upper ramp and lower ramp. The upper ramp and lower ramp diverge from one another in a direction away from the inner interior surface towards the interior compartment of the manifold head. One of the four flanges 136 is shown in phantom in FIG. 9. The ramps include a proximal end and a distal end. The proximal end is located slightly away from the edge of the opening. The distal end is spaced in an interference relationship regarding alignment of the opening. FIG. 9 A shows additional detail.

With reference to FIG. 8, it will be appreciated that as the clip 110 is inserted into the openings of the manifold head to the right of the figure, the slanted edge of each of the resilient arms 112 will be deflected by the respective ramp. Once the clip 110 is fully inserted through the four openings 100, the slot will extend past the distal end and the two arm pairs will clamp about the respective distal end with the edge of the slot coming into locking engagement with the distal end of the ramp. Meanwhile, the tubular portion 120 will be received by the tube fitting connector for sealing engagement. The other modular manifold head will be coupled in similar manner.

Figure 10:
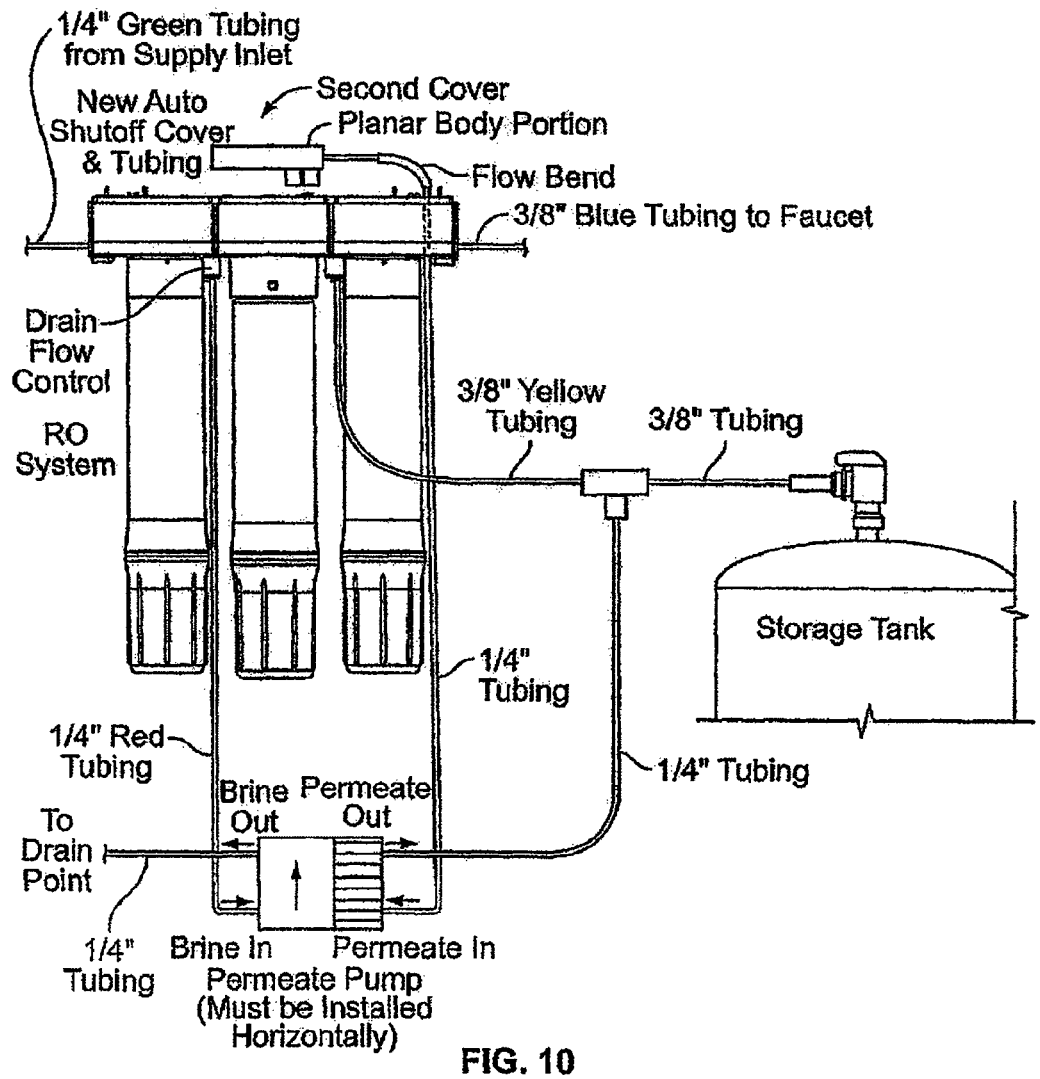
FIG. 10 is a schematic diagram of a reverse osmosis water treatment system with a permeate pump.
Figure 11:
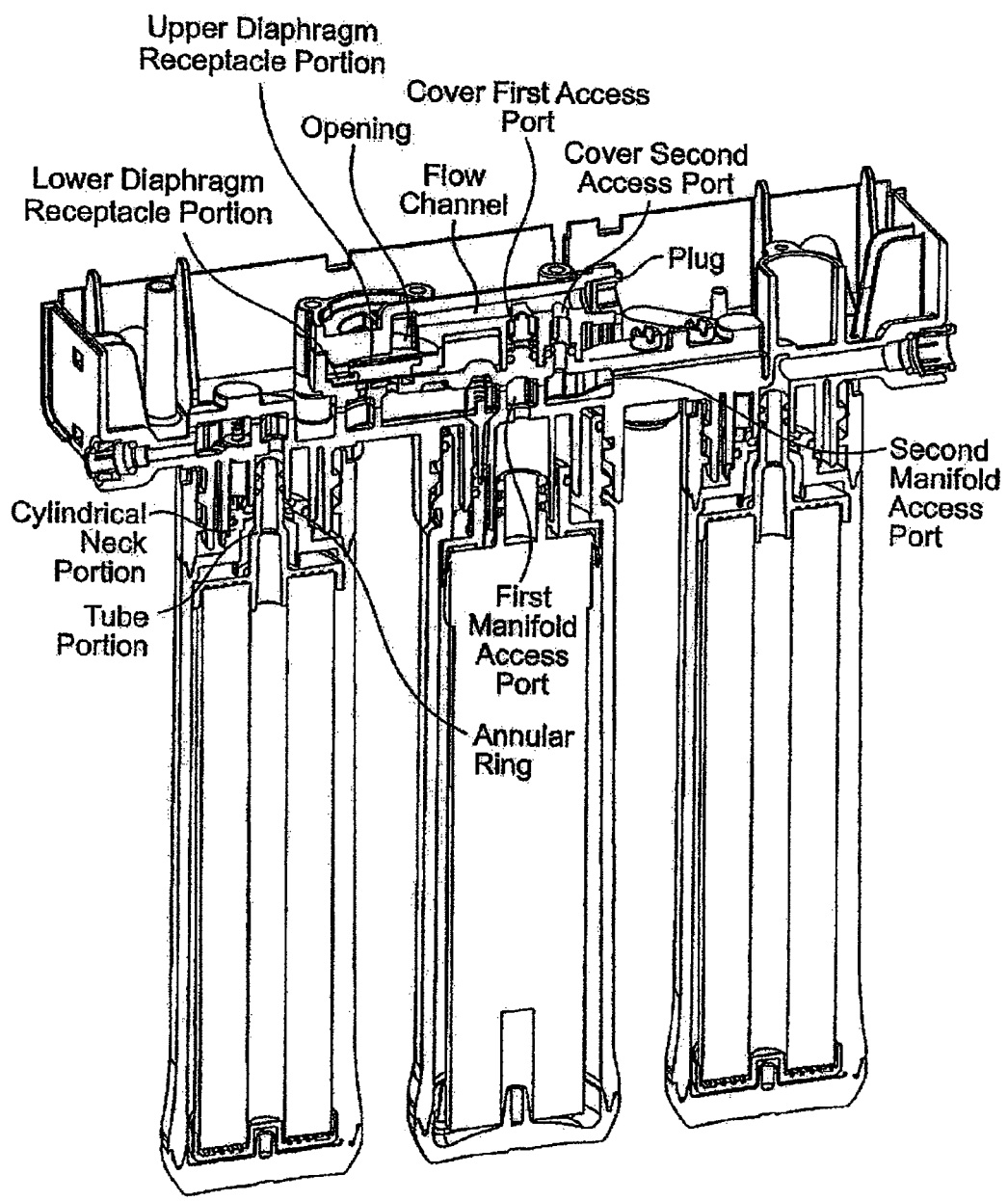
FIG. 11 is a cross-sectional view of the modular manifold head and cartridges of FIG. 1.

FIG. 10 shows a graphical representation of a water treatment system wherein an automatic shut-off valve cover may be removed and replaced with another cover adapted to accommodate a permeate pump application. With reference to FIG. 11, a cross-section of a water treatment system is shown including the modular manifold head, first cartridge, reverse osmosis cartridge and second filter cartridge. The manifold head is shown to include a connection fitting for receiving the respective connection fitting of the reverse osmosis cartridge. The manifold head includes a first manifold access port for coupling to an output of a reverse osmosis cartridge, a second manifold access port coupled to an output of a reverse osmosis stage. A non-permeate pump cover is adapted to seal the first and second access ports for a non-permeate pump application. A permeate pump cover is adapted to also seal the first and second access ports and includes a permeate pump output port which receives a tube fitting connector. The permeate pump cover includes a first access and a second access port and a flow channel in communication with the first and second access ports, as well as the permeate pump output port. A check valve assembly is located in the first access port for coupling the output of the reverse osmosis cartridge. The second cover includes a substantially planer body portion which defines a first end and a second end. Mounting holes are provided for fastening the cover to the manifold head.

Figure 12:
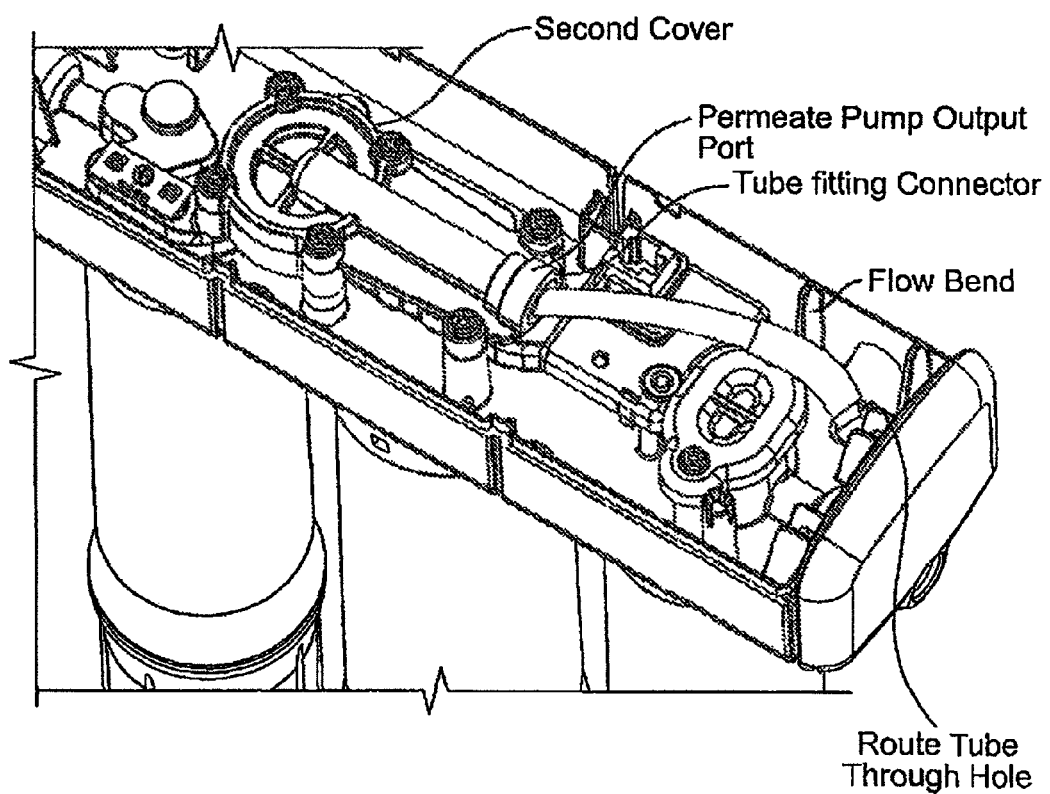
FIG. 12 is a top perspective view of a modular manifold head in a permeate pump application.

The manifold includes a lower diaphragm receptacle portion having an opened upper portion. The second cover includes an upper diaphragm receptacle portion for mating with the opened upper portion to form a diaphragm cavity which receives a diaphragm. The upper diaphragm receptacle portion includes an opening and fluid communication with the fluid channel. The manifold head includes a flow channel coupled to an output port of a pre-filter stage and an input port of the reverse osmosis stage, wherein the flow channel is in fluid communication with the lower diaphragm receptacle portion of the manifold head. It will be appreciated that the water treatment system may be assembled at the factory with a non-permeate pump cover, wherein the plug is provided at the permeate pump output port. A retrofit kit may be provided wherein the first cover is removed and replaced with the second cover having the tube fitting connector. A quarter inch tubing may then be coupled to the tube fitting connector and extend through a routing hole as shown in FIG. 12. The tubing extends downward and to a permeate pump as shown in FIG. 10. The permeate pump has a permeate outport having a tubing which runs to a T-connector. The T-connector has a further tubing coupled to a storage tank, as well as tubing coupled back to the manifold head. The brine side of the permeate pump includes a brine end from the drain flow of the manifold head and a brine out tubing which couples to the drain point. For sake of completeness, the tubing is also shown coming from the supply inlet and tubing is shown going to the faucet.

The installation kit includes at a minimum the second cover and further may include a replacement check valve, as well replacement O rings, tubing, fasteners and installation instructions.

FIG. 11 also shows the filter cartridge having a reduced gap at the connection fitting in order to minimize spillage during changing of the filter cartridge. The novel features of the filter cartridge are explained below. However, it will be apparent that the features can be incorporated into the reverse osmosis cartridge as well.

The filter cartridge includes external cartridge housing having a cylindrical portion with a top portion and a bottom portion. The bottom portion has a closed end. The top portion includes a shoulder having a generally cylindrical neck portion extending upward from the shoulder. The cylindrical neck portion defines a portion of a connection fitting. The cylindrical neck portion defines a cylindrical bore having a cylindrical bore wall which defines a first diameter. The cylindrical bore wall includes an annular ring protruding from the wall and defining a second diameter which is smaller than the first diameter. An internal cartridge housing includes a top portion with a shoulder, a tube portion extending upward from the internal shoulder, and the tube portion defining an outlet bore. The tube portion defines an outer diameter having a third diameter, wherein the third diameter is smaller than the first and second diameter. The tube portion and the annular ring define a cartridge inlet having an annular gap. It will be appreciated that the annular gap is minimized by this design and thereby reduces the likelihood of spillage. The manifold head is adapted to conform with the filter cartridge. In particular, the manifold head includes a connection fitting which includes an internal annular collar having a length defined such that when the cartridge is assembled to the manifold, the internal annular collar extends around the tube portion and up to the annular ring, with a minimum spacing for tolerance.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A water treatment system comprising: a cartridge having: an external cartridge housing, the housing having a cylindrical portion with a top portion and a bottom portion, the bottom portion having a closed end, the top portion having a shoulder with a generally cylindrical neck portion extending upward from the shoulder, the cylindrical neck portion defining a portion of a connection fitting, the cylindrical neck portion defining a cylindrical bore having a cylindrical bore wall which defines a first diameter, the cylindrical bore wall having an annular ring protruding from the wall and defining a second diameter which is smaller than the first diameter; an internal cartridge housing within the external cartridge housing and having a top portion, with a shoulder, a tube portion extending upward from the internal shoulder, the tube portion defining an outlet bore, the tube portion defining an outer diameter having a third diameter, the third diameter is smaller than the first and second diameters, the tube portion and the annular ring define a cartridge inlet having an annular gap.

2. The system of claim 1, further comprising a manifold head having a connection fitting which includes an internal annular collar having a length defined such that with the cartridge assembled to the manifold, the internal annular collar extends around the tube portion and extends adjacent the annular ring.

3. A filter cartridge comprising:
an external cartridge housing including a top end, a bottom end, and a filter portion extending longitudinally between said top end and said bottom end, said filter portion including a housing wall having an inside surface and an outside surface;
said top end including:
a shoulder, said shoulder and said housing wall inside surface forming an inner annular groove peripheral about said top end; and
a neck portion extending longitudinally beyond said shoulder and having at least one longitudinal bead on said neck portion extending outwards in the direction of said outside surface, said neck portion having an aperture for fluid flow; and
an internal cartridge housing within said external cartridge housing, having a protruding portion extending through said aperture of said neck portion and forming an annular gap with said aperture of said neck portion to allow fluid flow, said protruding portion of said internal cartridge housing having an aperture for fluid flow.

4. The filter cartridge of claim 3 including an outer annular collar releasably attachable to said filter cartridge having a bottom lip for insertion within said inner annular groove of said filter cartridge.

5. The filter cartridge of claim 4 including said outer annular collar having a double lead thread on an inner surface to releasably attach to a filter manifold.

6. The filter cartridge of claim 3 wherein said top end includes an annular lip on said housing wall with at least one longitudinal slot formed therein.

7. The filter cartridge of claim 3 wherein said top end includes an annular lip on said housing wall with a plurality of longitudinal slots formed therein and equally spaced apart from one another.

8. A filter cartridge comprising:
an external cartridge housing including a top end, a bottom end, and a filter portion extending longitudinally between said top end and said bottom end, said filter portion including a housing wall having an inside surface and an outside surface;
said top end including:
a shoulder, said shoulder and said housing wall inside surface forming an inner annular groove peripheral about said top end; and
a neck portion extending longitudinally beyond said shoulder and having at least one longitudinal bead on said neck portion extending outwards in the direction of said outside surface, said neck portion having an aperture for fluid flow;
an internal cartridge housing within said external cartridge housing, having a protruding portion extending through said aperture of said neck portion and forming an annular gap with said aperture of said neck portion to allow fluid flow, said protruding portion of said internal cartridge housing having an aperture for fluid flow; and
an annular collar having an outside surface, and inside surface, a top end, and a bottom end, said annular collar releasably attachable to a filter cartridge on said annular collar bottom end and a manifold on said annular collar top end, comprising:
a double lead thread on said inside surface adapted to mate with a corresponding outer threaded connector on said manifold; and
an extended lip portion on said annular collar bottom end for mating with an annular groove on said external filter cartridge.

9. A filter cartridge comprising:
an external cartridge housing having a cylindrical portion with a top portion and a bottom portion, the top portion having a shoulder with a generally cylindrical neck portion extending upward from the shoulder, the cylindrical neck portion defining a portion of a connection fitting and having a cylindrical bore wall defining a first diameter, the cylindrical bore wall having an annular ring protruding from the wall and defining a second diameter smaller than the first diameter; and
an internal cartridge housing within the external cartridge housing and having a top portion with a shoulder, a tube portion extending upward from the internal shoulder, the tube portion having a third diameter smaller than the second diameter, the tube portion and annular ring define a cartridge inlet having an annular gap.

* * * * *